US008346439B2

(12) United States Patent
Andres et al.

(10) Patent No.: US 8,346,439 B2
(45) Date of Patent: Jan. 1, 2013

(54) SAFETY METHOD AND DEVICE FOR VEHICLE ROLLOVER PREDICTION USING ESTIMATED LATERAL VEHICLE VELOCITY

(75) Inventors: Robert Andres, Clarkston, MI (US); Patrick Messi, Rochester Hills, MI (US); Eric Mertz, Rochester, MI (US); Holger Faisst, Sinzing (DE)

(73) Assignee: Continental Teves, Inc., Auburn Hills, MI (US)

( * ) Notice: Subject to any disclaimer, the term of this patent is extended or adjusted under 35 U.S.C. 154(b) by 604 days.

(21) Appl. No.: 12/565,882

(22) Filed: Sep. 24, 2009

(65) Prior Publication Data

US 2011/0071719 A1    Mar. 24, 2011

(51) Int. Cl.
*B60R 21/0132*    (2006.01)
(52) U.S. Cl. ............. 701/45; 701/38; 280/735; 180/282
(58) Field of Classification Search .................... 701/38, 701/45, 36, 29; 280/735; 180/271, 282; 340/440, 438; *B60R 21/0132*
See application file for complete search history.

(56) References Cited

U.S. PATENT DOCUMENTS

| | | | |
|---|---|---|---|
| 6,002,975 A * | 12/1999 | Schiffmann et al. ............ 701/36 |
| 6,301,536 B1 * | 10/2001 | Vaessen et al. .................. 701/45 |
| 6,421,592 B1 * | 7/2002 | Bargman et al. ................ 701/45 |
| 6,542,073 B2 * | 4/2003 | Yeh et al. ........................ 340/440 |
| 7,057,503 B2 * | 6/2006 | Watson ........................... 340/440 |
| 7,477,972 B2 * | 1/2009 | Stavroff et al. .................. 701/38 |
| 7,848,864 B2 * | 12/2010 | Huang ............................. 701/37 |
| 7,996,132 B2 * | 8/2011 | Park ................................ 701/46 |
| 2004/0073346 A1 * | 4/2004 | Roelleke ......................... 701/45 |
| 2004/0176893 A1 * | 9/2004 | Ogata et al. .................... 701/45 |
| 2005/0209757 A1 * | 9/2005 | Kueblbeck et al. ............ 701/46 |
| 2006/0025912 A1 * | 2/2006 | Haering et al. ................. 701/45 |
| 2006/0041336 A1 * | 2/2006 | Schubert et al. .................. 701/1 |
| 2006/0161323 A1 * | 7/2006 | Sawahata ........................ 701/45 |
| 2006/0178808 A1 * | 8/2006 | Wu et al. ........................ 701/124 |
| 2006/0238026 A1 * | 10/2006 | Lich ................................ 303/191 |
| 2008/0303254 A1 * | 12/2008 | Le et al. ......................... 280/735 |

* cited by examiner

*Primary Examiner* — Tuan C. To

(57) ABSTRACT

A system and method of activating a restraint system of a vehicle is described. The method includes generating a vehicle speed signal that represents a longitudinal speed of a vehicle, generating a lateral acceleration signal that represents a lateral acceleration of the vehicle, filtering the lateral acceleration signal to generate a filtered lateral acceleration signal, comparing the filtered lateral acceleration signal to a predetermined lateral acceleration enable threshold, estimating a lateral speed of the vehicle based on the vehicle speed signal when the filtered lateral acceleration exceeds the predetermined lateral acceleration enable threshold, and activating a restraint system of the vehicle based in part on the estimated lateral velocity.

23 Claims, 3 Drawing Sheets

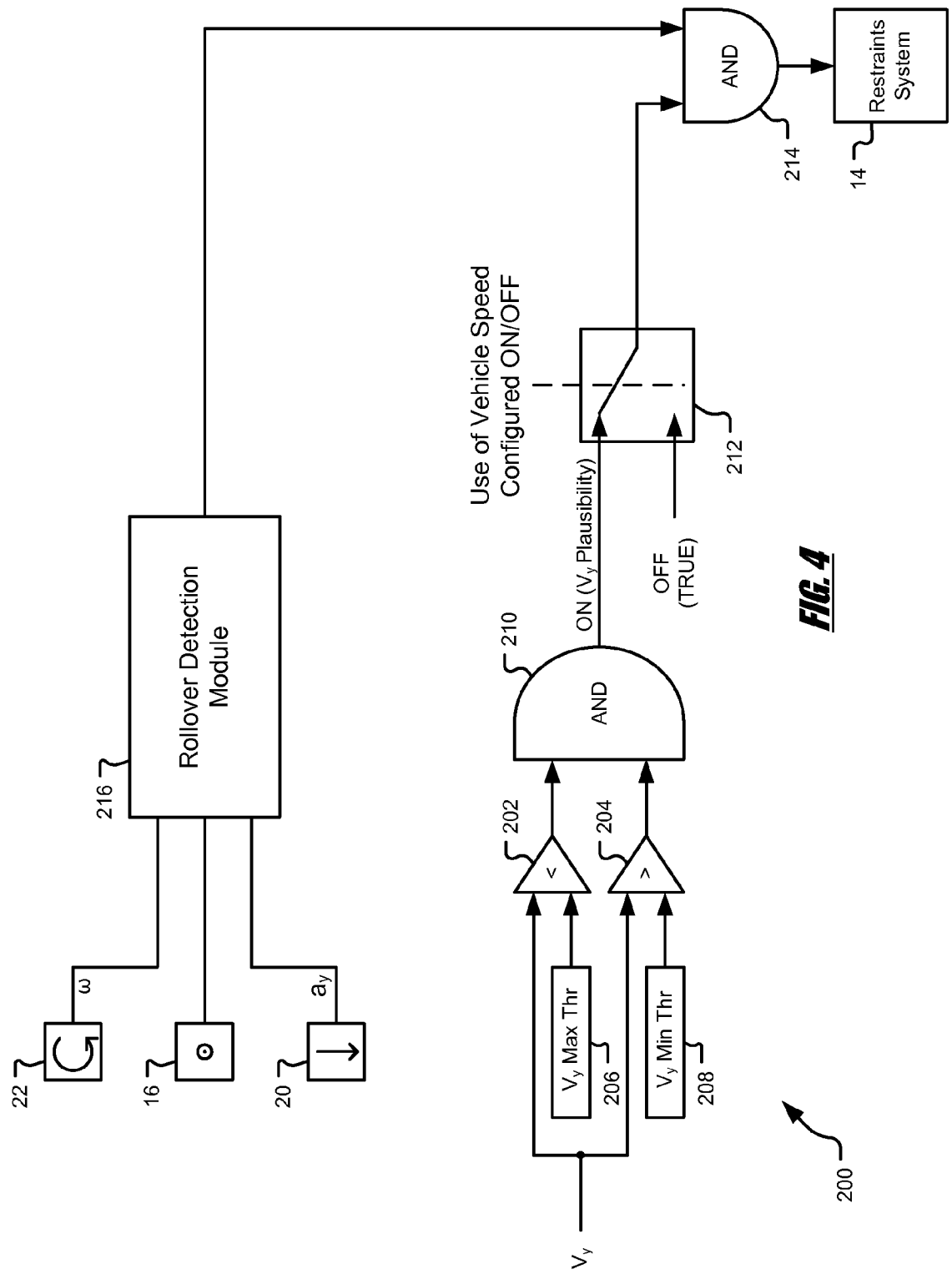

SAFETY METHOD AND DEVICE FOR VEHICLE ROLLOVER PREDICTION USING ESTIMATED LATERAL VEHICLE VELOCITY

FIELD

The present disclosure relates to vehicle rollover detection systems, and more particularly to inferring a rollover based on vehicle speed.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Modern road vehicles may include a roll over detection system. The system detects when the vehicle is about to roll over and then activates one or more safety devices in an attempt to mitigate injury to vehicle occupants. Examples of safety devices include side air bags and curtains, seat belt pretensioners, active roll bars, and the like.

SUMMARY

A method of activating a restraint system of a vehicle is described. The method includes generating a vehicle speed signal that represents a longitudinal speed of a vehicle, generating a lateral acceleration signal that represents a lateral acceleration of the vehicle, filtering the lateral acceleration signal to generate a filtered lateral acceleration signal, comparing the filtered lateral acceleration signal to a predetermined lateral acceleration enable threshold, estimating a lateral speed of the vehicle based on the vehicle speed signal when the filtered lateral acceleration exceeds the predetermined lateral acceleration enable threshold, and activating a restraint system of the vehicle based in part on the estimated lateral velocity.

In other features the method includes resetting the estimated lateral speed to a predetermined value when the filtered lateral acceleration signal is less than a reset lateral acceleration threshold for a predetermined duration. The method includes monitoring a vehicle network status and employing a predetermined value for the estimated lateral speed while the vehicle network status indicates that the vehicle speed signal is in a fault condition. Activating the restraint system is further based on a roll rate sensor signal. Activating the restraint system is further based on a lateral acceleration sensor signal. Activating the restraint system is further based on a vertical acceleration sensor signal.

A control system for activating a restraint system of a vehicle includes a vehicle speed sensor that generates a vehicle speed signal based on longitudinal speed of a vehicle, a lateral acceleration sensor that generates a lateral acceleration signal based on lateral acceleration of the vehicle, a filter that filters the lateral acceleration signal to generate a filtered lateral acceleration signal, a comparator that compares the filtered lateral acceleration signal to a predetermined lateral acceleration enable threshold, and a processor that estimates a lateral speed of the vehicle based on the vehicle speed signal when the filtered lateral acceleration exceeds the predetermined lateral acceleration enable threshold, and a restraint system that is activated based in part on the estimated lateral velocity.

In other features the processor resets the estimated lateral speed to a predetermined value when the filtered lateral acceleration signal is less than a reset lateral acceleration threshold for a predetermined duration. The processor monitors a vehicle network status and employs a predetermined value for the estimated lateral speed while the vehicle network status indicates that the vehicle speed signal is in a fault condition. A roll rate sensor communicates with the processor and the restraint system is activated based on a roll rate sensor signal. A lateral acceleration sensor communicates with the processor and the restraint system is activated based on a lateral acceleration sensor signal. A vertical acceleration sensor communicates with the processor and the restraint system is activated based on a vertical acceleration sensor signal.

A control system for activating a restraint system of a vehicle includes vehicle speed sensing means for generating a vehicle speed signal based on longitudinal speed of a vehicle, lateral acceleration sensing means for generating a lateral acceleration signal based on lateral acceleration of the vehicle, filter means for filtering the lateral acceleration signal to generate a filtered lateral acceleration signal, comparator means for comparing the filtered lateral acceleration signal to a predetermined lateral acceleration enable threshold, processor means for estimating a lateral speed of the vehicle based on the vehicle speed signal when the filtered lateral acceleration exceeds the predetermined lateral acceleration enable threshold and for resetting the estimated lateral speed to a predetermined value when the filtered lateral acceleration signal is less than a reset lateral acceleration threshold for a predetermined duration, and restraint system means for activating a passenger restraint system based in part on the estimated lateral velocity.

In other features the processor monitors a vehicle network status and employs a predetermined value for the estimated lateral velocity while the vehicle network status indicates that the vehicle speed signal is in a fault condition. Roll rate sensor means communicate with the processor and the restraint system is activated based on a filtered roll rate sensor signal. Lateral acceleration sensor means communicate with the processor and the restraint system is activated based on a filtered lateral acceleration sensor signal. Vertical acceleration sensor means communicate with the processor and the restraint system is activated based on a filtered vertical acceleration sensor signal.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a logic diagram of a first rollover detection algorithm that employs the estimated lateral velocity.

DETAILED DESCRIPTION

Figure 1:
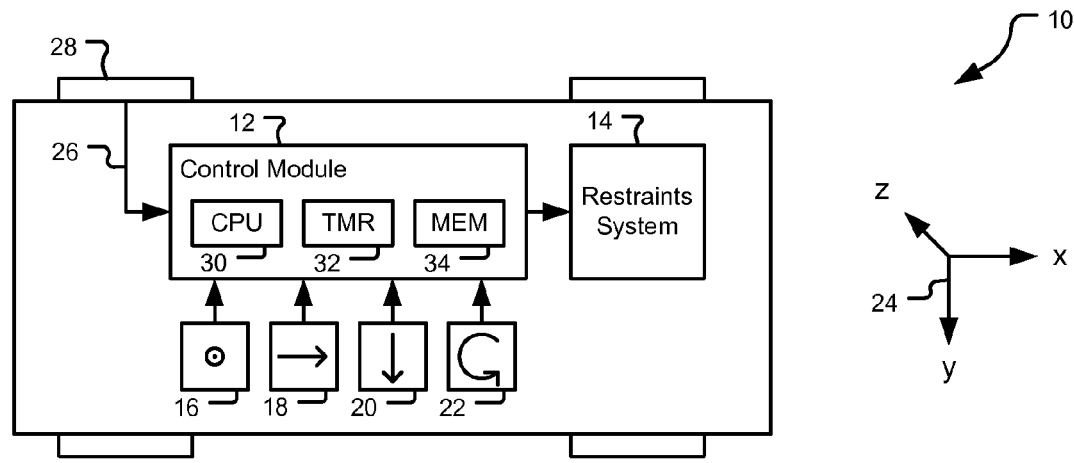
FIG. 1 is a functional block diagram of a rollover detection system in a vehicle.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and computer readable memory that execute one or more software or firmware programs, a combinational logic circuit, and/or other suitable components that provide the described functionality.

Referring now to FIG. 1, a functional block diagram is shown of a vehicle 10. Vehicle 10 includes a rollover detection system that employs vehicle speed along a longitudinal axis x (shown at coordinate system 24) to help detect a rollover. The rollover detection system includes a control module 12 that receives data from one or more sensors. Control module 12 determines whether vehicle 10 is rolling over based on the data and activates a restraints system 14 based on the determination. Restraints system 14 can include one or more of side air bags, side curtains, seat belt pretensioners, active roll bars, and the like. The sensors include a vertical acceleration sensor 16, a lateral acceleration sensor 20, and a roll rate sensor 22.

Vertical acceleration sensor 16 generates a signal based on acceleration of vehicle 10 in the z direction as indicated by coordinate system 24. Longitudinal acceleration sensor 18 generates a signal based on acceleration of vehicle 10 in the x direction as indicated by coordinate system 24. Lateral acceleration sensor 20 generates a signal based on acceleration of vehicle 10 in the y direction as indicated by coordinate system 24. Roll rate sensor 22 generates a signal based on angular rate of vehicle 10 about the longitudinal or x axis of vehicle 10.

Control module 12 also receives a vehicle speed signal 26. Vehicle speed signal 26 can be generated by a vehicle speed sensor as is known in the art and represents the speed of a wheel 28. Control module 12 also includes a processor 30, a timer module 32, and memory 34. Processor 30 executes methods that are described below. Timer module 32 implements various timers that are employed by the methods. Memory 34 stores computer instructions that implement the methods and executed by processor 30.

Figure 2:
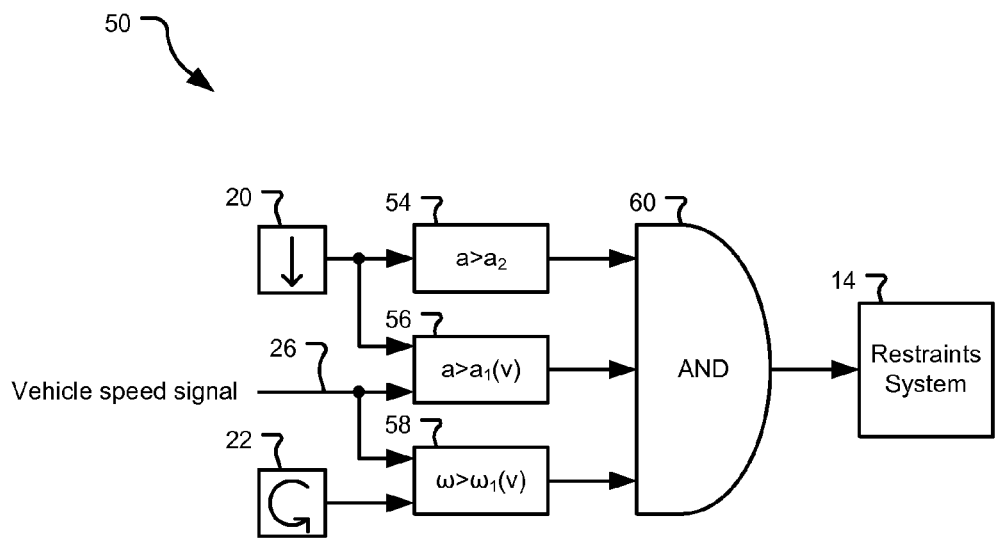
FIG. 2 is a logic diagram of a rollover detection method that uses estimated lateral velocity of a vehicle as an input to influence performance.

Referring now to FIG. 2, a functional block diagram is shown of a method 50. Method 50 employs the estimated lateral velocity that is determined by the vehicle speed signal 26. The estimated lateral velocity is used to supplement data from roll rate sensor 22 and more quickly determine whether vehicle 10 is rolling over than if roll rate sensor 22 were employed alone.

Method 50 simultaneously evaluates the data from lateral acceleration sensor 20, vehicle speed signal 26, and roll rate sensor 22 to determine whether to activate restraints system 14. The data from lateral acceleration sensor 20 is analyzed to determine whether the forward motion (x-axis) of vehicle 10 has converted to sliding motion (y-axis). To make the determination, block 54 determines whether the lateral acceleration "a" (y-axis) exceeds a predetermined lateral acceleration "$a_2$". In some embodiments the predetermined lateral acceleration "$a_2$" is about 1.0 g. When the lateral acceleration "a" exceeds the predetermined lateral acceleration "$a_2$" then block 54 provides a logic true condition to a first input of an AND gate 60. Otherwise block 54 communicates a logic false condition to the first input of AND gate 60.

Block 56 determines whether the vehicle lateral acceleration is greater than a predetermined acceleration $a_1(v)$. The predetermined acceleration can be based on the vehicle speed signal 26. If the vehicle lateral acceleration exceeds the predetermined acceleration then block 56 communicates a logic true condition to a second input of AND gate 60. Otherwise block 56 communicates a logic false condition to the second input of AND gate 60.

Block 58 evaluates the data from roll rate sensor 22 and vehicle signal 26. Block 58 determines whether the roll rate ω exceeds a predetermined roll rate $ω_1(v)$. The predetermined roll rate can be based on the vehicle speed signal 26. If the roll rate exceeds the predetermined roll rate then block 58 communicates a logic true condition to a third input of AND gate 60. Otherwise block 58 communicates a logic false condition to the third input of AND gate 60. When all three inputs to AND gate 60 are logic true then restraints system 14 is activated to mitigate effects of the vehicle rollover.

Figure 3:
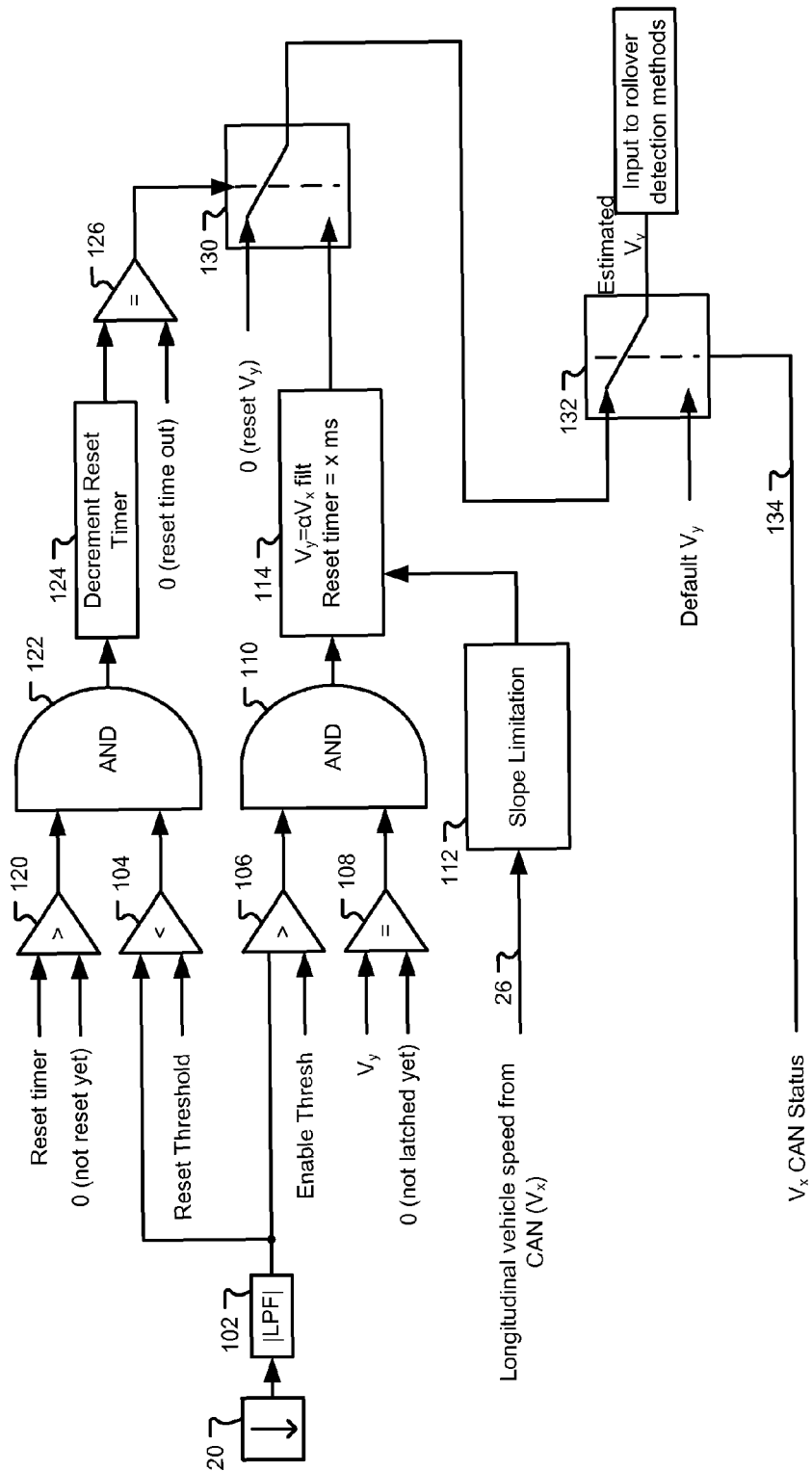
FIG. 3 is a logic diagram of a first embodiment of a method to estimate the lateral velocity of a vehicle.

Referring now to FIG. 3, a logic diagram is shown of a method 100. Method 100 estimates how much, if any, of vehicle 10 longitudinal velocity $V_x$ has translated to a lateral velocity $V_y$. A low pass filter 102 filters the signal from lateral acceleration sensor 20. The filtered signal is communicated to a first input of a comparator 104 and a first input of another comparator 106. Comparator 104 generates a logic true signal while the lateral acceleration is less than a first predetermined lateral acceleration or reset threshold. Comparator 106 generates a logic true signal while the lateral acceleration is greater than a second predetermined lateral acceleration or enable threshold.

A comparator 108 generates a logic true signal while the lateral velocity $V_y$ is equal to zero. The outputs of comparators 106 and 108 are applied to an input of an AND gate 110. An output of AND gate 110 generates a logic true while the filtered lateral acceleration from lateral acceleration sensor 20 is high and the estimated lateral velocity $V_y$ is still zero, e.g. vehicle 10 is decelerating laterally with a level higher than most road surfaces will allow.

A slope limitation module 112 generates an interim value of $V_x$ based on vehicle speed $V_x$, which is provided by vehicle speed signal 26. Slope limitation module 112 limits the interim value of $V_x$ based on predetermined deceleration and acceleration thresholds. The deceleration and acceleration thresholds can be determined experimentally and in some embodiments are about 1.1 g and 1.0 g, respectively. While the output of AND gate 110 is true, an estimator module 114 latches $V_y$ with the interim value of $V_x$ and initializes a reset timer to a predetermined reset time. The reset timer can be implemented with timer module 32, which is best shown in FIG. 1. An output of estimator module 114 communicates the estimated value of $V_y$.

A process for resetting $V_y$ will now be described. A comparator 120 generates a logic true signal while the reset timer is counting, i.e. not expired. The output of comparator 120 is communicated to an input of an AND gate 122. A second input of AND gate 122 is communicated from the output of comparator 104. The output of AND gate 122 therefore generates a logic true while the filtered lateral acceleration is less than the predetermined reset threshold and the reset timer is active. Block 124 decrements the reset timer so long as the output of AND gate 122 is true.

A comparator 126 outputs a logic true signal when the reset timer has expired, e.g. counted down to zero. When the reset timer expires a logic switch 130 resets the estimated lateral velocity $V_y$ to zero.

The output of logic switch 130 communicates with an input of another logic switch 132. Logic switch 132 provides a default value for the lateral estimated velocity in the event the vehicle speed signal 26 is lost. In the depicted embodiment vehicle speed signal 26 is communicated via a controller area network (CAN) bus as is known in the art. A CAN bus status signal 134 indicates whether the CAN bus is communicating vehicle speed signal 26 and also controls logic switch 132. The output of logic switch 132 communicates the estimated lateral velocity to rollover sensing algorithms that are described below.

Referring now to FIG. 4, a logic diagram is shown of a first rollover detection method 200 that employs the estimated lateral velocity $V_y$ from method 100. When properly calibrated, method 200 activates restraints system 14 when vehicle rollover is predicted.

Lateral velocity $V_y$ is communicated to respective inputs of a comparator 202 and a comparator 204. Comparator 202 outputs logic true when the lateral velocity $V_y$ is less than a $V_y$ max threshold 206, i.e. a predetermined maximum lateral velocity. Comparator 204 outputs logic true when the lateral velocity $V_y$ is greater than a $V_y$ min threshold 208, i.e. a predetermined minimum lateral velocity. An AND gate 210 logically ANDs the outputs of comparators 202 and 204. The output of AND gate 210 is logical true when the lateral velocity $V_y$ is between the min and max thresholds 206, 208, which indicates that lateral motion of vehicle 10 is plausible. A logic switch 212 communicates either a logic true or the output of AND gate 210 to an input of an AND gate 214. Logic switch 212 is controlled by a configuration setting that indicates whether method 200 should employ the estimated lateral velocity $V_y$ in determining a roll over condition.

A rollover detection module 216 communicates a signal to a second input of AND gate 214. Rollover detection module 216 receives respective signals from one or more of vertical acceleration sensor 16, lateral acceleration sensor 20, and roll rate sensor 22. Based on the signals, rollover detection module 216 employs methods known in the art to determine whether vehicle 10 is rolling over. If it is determined that vehicle 10 is rolling over then rollover detection module 216 communicates a logic true to the second input of AND gate 214.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of activating a restraint system of a vehicle, comprising:
    generating a vehicle speed signal that represents a longitudinal speed of a vehicle;
    generating a lateral acceleration signal that represents a lateral acceleration of the vehicle;
    filtering the lateral acceleration signal to generate a filtered lateral acceleration signal;
    comparing the filtered lateral acceleration signal to a predetermined lateral acceleration enable threshold;
    estimating a lateral velocity of the vehicle based on the vehicle speed signal when the filtered lateral acceleration exceeds the predetermined lateral acceleration enable threshold; and
    activating a restraint system of the vehicle based in part on the estimated lateral velocity.

2. The method of claim 1 further comprising resetting the estimated lateral velocity to a predetermined value when the filtered lateral acceleration signal is less than a reset lateral acceleration threshold for a predetermined duration.

3. The method of claim 1 further comprising monitoring a vehicle network status and employing a predetermined value for the estimated lateral velocity while the vehicle network status indicates that the vehicle speed signal is in a fault condition.

4. The method of claim 1 wherein activating the restraint system is further based on a roll rate sensor signal.

5. The method of claim 4 wherein activating the restraint system is further based on a lateral acceleration sensor signal.

6. The method of claim 5 wherein activating the restraint system is further based on a vertical acceleration sensor signal.

7. A control system for activating a restraint system of a vehicle, comprising:
    a vehicle speed sensor that generates a vehicle speed signal based on longitudinal speed of a vehicle;
    a lateral acceleration sensor that generates a lateral acceleration signal based on lateral acceleration of the vehicle;
    a filter that filters the lateral acceleration signal to generate a filtered lateral acceleration signal;
    a comparator that compares the filtered lateral acceleration signal to a predetermined lateral acceleration enable threshold; and
    a processor that estimates a lateral velocity of the vehicle based on the vehicle speed signal when the filtered lateral acceleration exceeds the predetermined lateral acceleration enable threshold; and
    a restraint system that is activated based in part on the estimated lateral velocity.

8. The system of claim 7 wherein the processor resets the estimated lateral velocity to a predetermined value when the filtered lateral acceleration signal is less than a reset lateral acceleration threshold for a predetermined duration.

9. The system of claim 7 wherein the processor monitors a vehicle network status and employs a predetermined value for the estimated lateral velocity while the vehicle network status indicates that the vehicle speed signal is in a fault condition.

10. The system of claim 7 further comprising a roll rate sensor that communicates with the processor and wherein the restraint system is activated based on a roll rate sensor signal.

11. The system of claim 10 further comprising a later acceleration sensor that communicates with the processor and wherein the restraint system is activated based on a lateral acceleration sensor signal.

12. The system of claim 11 further comprising a vertical acceleration sensor that communicates with the processor and wherein the restraint system is activated based on a vertical acceleration sensor signal.

13. A control system for activating a restraint system of a vehicle, comprising:
    vehicle speed sensing means for generating a vehicle speed signal based on longitudinal speed of a vehicle;

lateral acceleration sensing means for generating a lateral acceleration signal based on lateral acceleration of the vehicle;

filter means for filtering the lateral acceleration signal to generate a filtered lateral acceleration signal;

comparator means for comparing the filtered lateral acceleration signal to a predetermined lateral acceleration enable threshold;

processor means for estimating a lateral speed of the vehicle based on the vehicle speed signal when the filtered lateral acceleration exceeds the predetermined lateral acceleration enable threshold and for resetting the estimated lateral speed to a predetermined value when the filtered lateral acceleration signal is less than a reset lateral acceleration threshold for a predetermined duration; and restraint system means for activating a passenger restraint system based in part on the estimated lateral speed.

14. The system of claim 13 wherein the processor monitors a vehicle network status and employs a predetermined value for the estimated lateral speed while the vehicle network status indicates that the vehicle speed signal is in a fault condition.

15. The system of claim 13 further comprising roll rate sensor means for communicating with the processor and wherein the restraint system is activated based on a filtered roll rate sensor signal.

16. The system of claim 15 further comprising lateral acceleration sensor means for communicating with the processor and wherein the restraint system is activated based on a filtered lateral acceleration sensor signal.

17. The system of claim 16 further comprising vertical acceleration sensor means for communicating with the processor and wherein the restraint system is activated based on a filtered vertical acceleration sensor signal.

18. A computer readable memory that includes instructions for a processor wherein the instructions implement a method of activating a restraint system of a vehicle, comprising:

generating a vehicle speed signal that represents a longitudinal speed of a vehicle;

generating a lateral acceleration signal that represents a lateral acceleration of the vehicle;

filtering the lateral acceleration signal to generate a filtered lateral acceleration signal;

comparing the filtered lateral acceleration signal to a predetermined lateral acceleration enable threshold;

estimating a lateral speed of the vehicle based on the vehicle speed signal when the filtered lateral acceleration exceeds the predetermined lateral acceleration enable threshold; and activating a restraint system of the vehicle based in part on the estimated speed.

19. The method of claim 18 further comprising resetting the estimated lateral speed to a predetermined value when the filtered lateral acceleration signal is less than a reset lateral acceleration threshold for a predetermined duration.

20. The method of claim 18 further comprising monitoring a vehicle network status and employing a predetermined value for the estimated lateral speed while the vehicle network status indicates that the vehicle speed signal is in a fault condition.

21. The method of claim 18 wherein activating the restraint system is further based on a roll rate sensor signal.

22. The method of claim 21 wherein activating the restraint system is further based on a lateral acceleration sensor signal.

23. The method of claim 22 wherein activating the restraint system is further based on a vertical acceleration sensor signal.

* * * * *